United States Patent
Nessett et al.

(10) Patent No.: US 6,182,149 B1
(45) Date of Patent: Jan. 30, 2001

(54) SYSTEM FOR MANAGING DYNAMIC PROCESSING RESOURCES IN A NETWORK

(75) Inventors: Danny M. Nessett; Wenjun Luo, both of Fremont, CA (US)

(73) Assignee: 3Com Corporation, Santa Clara, CA (US)

(*) Notice: Under 35 U.S.C. 154(b), the term of this patent shall be extended for 0 days.

(21) Appl. No.: 09/228,208

(22) Filed: Jan. 11, 1999

(51) Int. Cl.[7] ....................................................... G06F 13/00

(52) U.S. Cl. ............................................................. 709/247

(58) Field of Search ................................... 709/200, 227, 709/228, 231, 246, 247; 380/1, 255, 556, 257, 269, 42

(56) References Cited

U.S. PATENT DOCUMENTS 4,386,416 * 5/1983 Giltner et al. ........................ 710/68

* cited by examiner

Primary Examiner—Robert B. Harrell
(74) Attorney, Agent, or Firm—Wilson Sonsini Goodrich & Rosati

(57) ABSTRACT

Active networking techniques enable intermediate systems to determine whether data in a packet which is traversing the system is compressed, encrypted or otherwise dynamically processed. Based on this determination, the dynamic processing resources at the intermediate system are invoked or not. Thus, dynamic processing resources can be conserved. Active networking data is placed in packets flowing between end systems. The end system sending these packets may not know whether there are intermediate systems between it and the other end system that require knowledge about compressed data in the packet. It places the active networking data in packets so that any intermediate systems that can use knowledge of which packets contain compressed data may use the active networking data to make the determination.

36 Claims, 6 Drawing Sheets

SYSTEM FOR MANAGING DYNAMIC PROCESSING RESOURCES IN A NETWORK

BACKGROUND OF THE INVENTION

1. Field of the Invention

The present invention relates to protocols used for managing compression resources distributed in a network, and more particularly to techniques for avoiding the use of compression resources on data that has already been compressed, or is otherwise less suitable for compression by intermediate links in a network.

2. Description of Related Art

The Internet includes a web of communication links through which data paths are established from end station to end station. End stations setup sessions using protocols such as the Transmission Control Protocol over the Internet Protocol TCP/IP or the User Datagram Protocol over the Internet Protocol UDP/IP. Packets in the sessions are routed through the links in the web and traverse intermediate stations.

Links between intermediate stations in the web are managed independent of, and often transparent to, the end stations. For example, intermediate stations interconnected by a long distance link may perform functions such as encryption, tunneling, and compression. One intermediate station function involves standard IPSEC Internet protocol security specified in RFC 1826 and RFC 1827. IPSEC is established between intermediate stations, for example between routers at separate campuses of a company. In this way, data sent between the campuses is protected. It is desirable to compress the data being sent between the campuses in order to preserve bandwidth. Also it is found that data which has been encrypted does not compress well because the encryption protocol tends to randomize the data and make it more difficult to compress. Thus, installations which apply the IPSEC protocol across intermediate links compress the data prior to encryption. The compressed data is encrypted and transmitted across the links to the remote campus.

However, not all data is suitable for compression. Thus, the compression resources at these intermediate stations are being wasted on certain kinds of data. For example, end stations may send data which has already been compressed between one another. To compress it once again at an intermediate station will not yield significant difference in its size.

Accordingly, it is desirable to provide a technique by which the resources at intermediate stations in the network can be conserved while maintaining the efficient use of the available bandwidth.

SUMMARY OF THE INVENTION

The present invention uses techniques of active networking to enable intermediate systems to determine whether data in a packet which is traversing the system is compressed. Based on this determination, the compression resources at the intermediate system are invoked or not. Thus, compression resources can be conserved.

Active networking is a term used to identify a class of communication techniques by which networking equipment places special data in packets to control network device behavior. This may be done in a number of different ways. According to the present invention, active networking data is placed in packets flowing between end systems. The end system sending these packets may not know whether there are intermediate systems between it and the other end system of a communication session, that require knowledge about compressed data, encrypted data, or other dynamically processed data in the packet. It places the active networking data in packets so that any intermediate systems that can use knowledge of which packets contain the dynamically processed data, may use the active networking data to make the determination.

Thus according to the present invention, a method for managing use of compression resources, and alternatively encryption resources or other dynamic processing resources, in the intermediate devices of the network is provided. According to the method, sessions are established for transmitting a plurality of packets which have session identifiers and data payloads between the sending end station and receiving end station. The session has a path through an intermediate device in the network which includes compression resources in a preferred embodiment. A message is sent which is picked up by the intermediate device in the path, which indicates a characteristic relevant to the compression resources of the data payloads in the session. The packets of the session are transmitted through the intermediate device, which can now recognize them and determine whether to apply compression resources or not based on the information in the message. Thus, according to one aspect of the invention, the data payloads in the packets are dynamically processed, such as by compression, at the sending end station in a way which reduces the effectiveness of compression, encryption or other dynamic process resources at the intermediate station. The characteristic of the data payloads in the session according to this aspect of the invention comprises notification of the dynamic processing in the end station.

According to various aspects of the invention, the process of establishing a session between a sending end station and a receiving end station may include establishing a tunneling protocol session between the sending end station and an intermediate device acting as a tunnel gateway. An intermediate system either within the tunneling path, or outside the tunneling path includes the compression, encryption or other dynamic process resources and acts upon the message that indicates types of packets to be compressed. The tunneling protocol may include a Layer 2 Tunneling Protocol L2TP, a Point-to-Point Tunneling Protocol PPTP, or other tunneling techniques known in the art.

According to other aspects of the invention, the characteristic relevant to the compression resources of the data payloads in the session comprises a filter definition for identifying packets in the particular session. According to another aspect, a filter definition identifies packets in the session and identifies the already compressed parts of the identified packets. In this manner, the compression resources may be selectively applied, at particular intermediate stations capable of doing so, or capable of executing a program provided in an active packet to do so, to portions of the packet which have not been compressed, or otherwise processed in a way which reduces the effectiveness of the compression resource at the particular intermediate station.

According to yet another aspect of the invention, the message comprises an active packet that includes filter definitions and/or a program of instructions executable in the intermediate device to implement the filter. Alternatively, the message may comprise an object that includes the filter definition, and a method, or a reference to a method used in implementation of the filter.

According to another aspect, the invention can be characterized from the point-of-view of the intermediate device.

Thus, in a network including end stations establishing communication sessions through intermediate devices, a method for managing use of the compression, encryption or other dynamic process resources in the intermediate devices is provided. The method includes receiving at an intermediate device a message in the form of an active packet, traversing a path of a session between end stations other than the intermediate device, indicating a characteristic relevant to the compression resources, in one preferred embodiment, of the data payloads in the particular session. In response to the message, a filter is established in intermediate device to identify packets in the particular session. The data payloads received at the intermediate station identified using the filter are forwarded without applying the compression resources of the intermediate device. The data payloads not identified using the filter are forwarded after applying the compression resources.

According to one aspect of the invention, before the step of forwarding the data payloads, the data is encrypted, such as according to the IPSEC protocol.

According to other aspects of the invention, the message comprises a packet transmitted in connection with establishment of a particular session, according to the Resource Reservation Protocol RSVP. The message may comprise filter definitions, a combination of filter definitions and a program of instructions, or objects, such as JAVA objects which include variables and methods used in establishment of the filter.

In yet another aspect of the invention, sessions are established for transmitting a plurality of packets having session identifiers in data payloads between a sending end station and a receiving end station according to a transport layer protocol such as UDP. The session has a path through an intermediate device in the network which includes compression resources. A message is sent which is picked up by the intermediate device in the path of the data payloads in the session which includes compressed data. The data payloads are compressed at the sending end station, and the packets are transmitted including compressed data payloads to the receiving end station. The message transmitted to the intermediate device comprises a packet transmitted by the sending end station during establishment of this particular session, such as according to the RSVP protocol. In various embodiments, the message sent to the intermediate device may be originated from an end station. Also, the end stations of a session may comprise network devices which are acting as tunnel gateways, or other edge devices in the network between which communication sessions are established.

Other aspects and advantages of the present invention can be seen upon review of the figures, the detailed description and the claims which follow.

DETAILED DESCRIPTION

Figure 1:
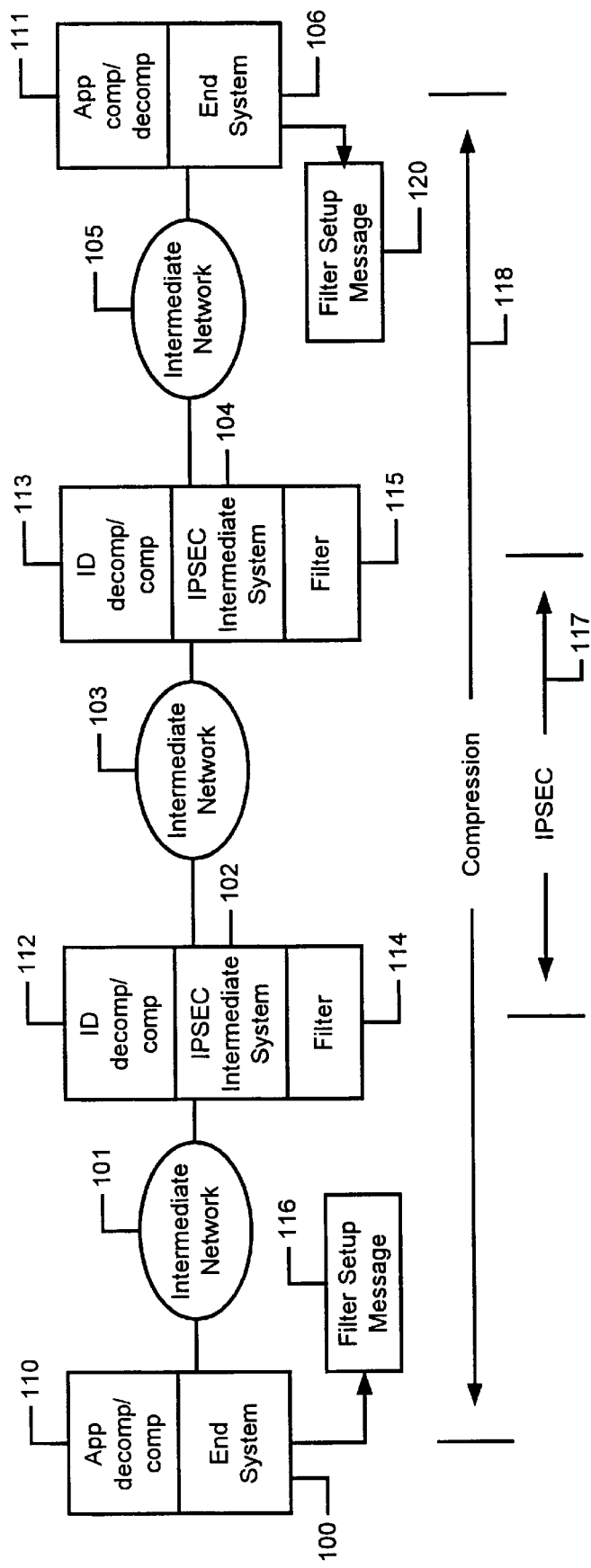
FIG. 1 is a simplified diagram of one network configuration according to the present invention.
Figure 2:
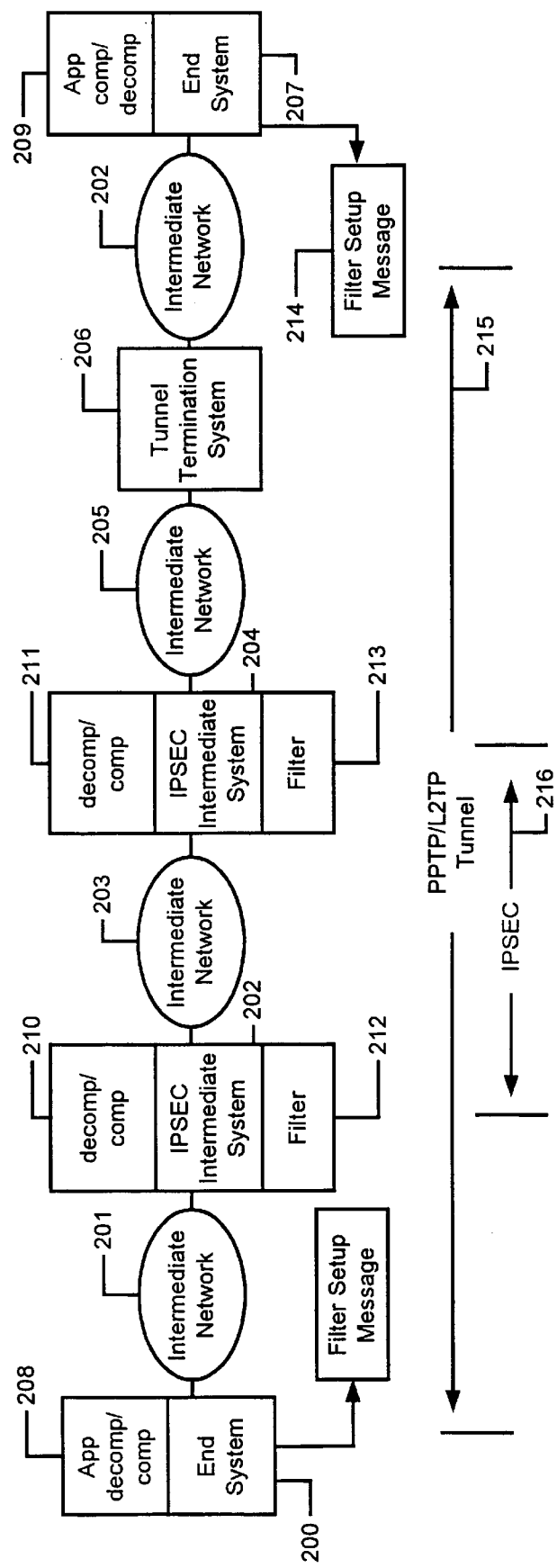
FIG. 2 is a simplified diagram of a second network configuration according to the present invention.
Figure 3:
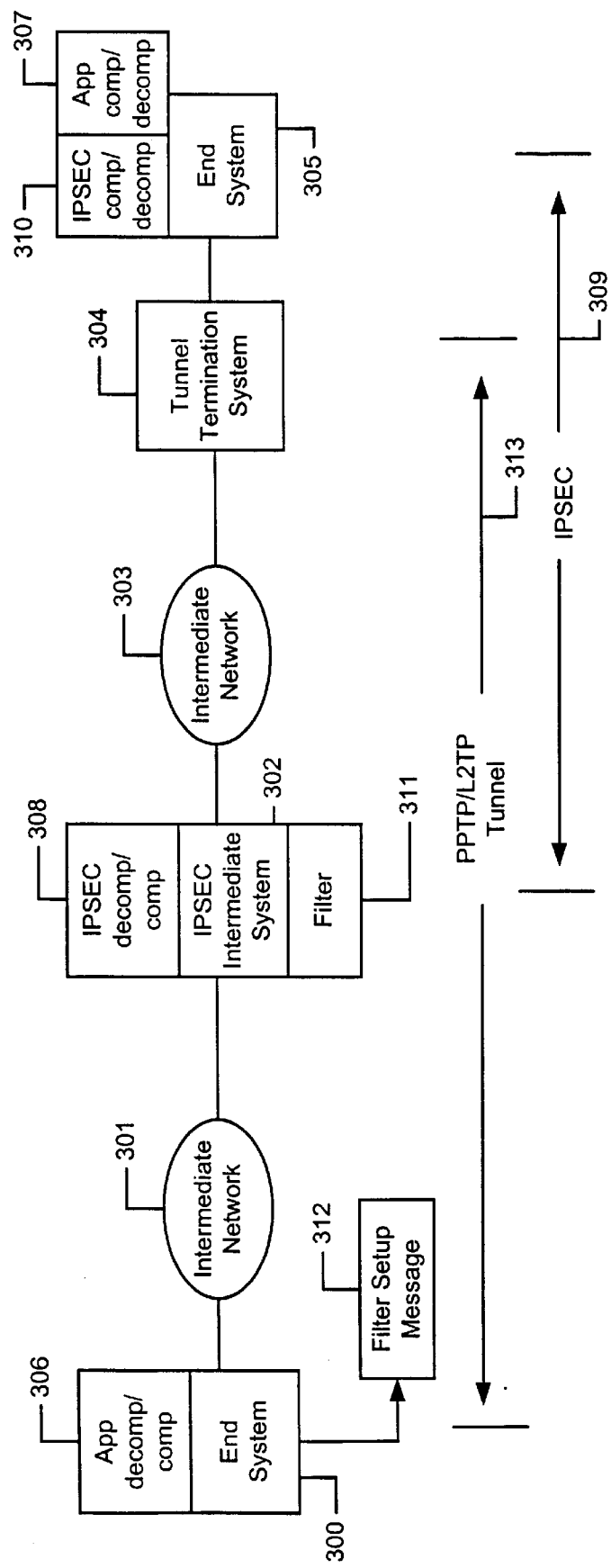
FIG. 3 is a simplified diagram of a third network configuration according the present invention.

A detailed description of the present invention is provided with respect to FIGS. 1–6, in which FIGS. 1–3 illustrate various network configurations in which the present invention is applicable. According to FIG. 1, a network includes an end system 100 coupled to an intermediate network 101. An intermediate system 102 is coupled to the intermediate network 101 and a second intermediate network 103. A second intermediate system 104 is coupled to the intermediate network 103 and a third intermediate network 105. A second end station 106 is coupled to the third intermediate network 105. In this configuration, the end systems 100 and 106 include application layer compression and decompression resources 110 and 111, respectively. The intermediate systems 102 and 104 include Internet protocol security resources (such as IPSEC) and intermediate device compression and decompression resources 112 and 113 respectively. In addition, the intermediate systems 102 and 104 include resources for establishing filters 114 and 115 respectively in response to filter setup messages 116 which originate with end stations or elsewhere in the network. In this example, a IPSEC channel is established between the intermediate system 102 and the intermediate system 104 to provide confidentiality in the intermediate network 103. Prior to encrypting data for the IPSEC channel 117, the intermediate systems 102 and 104 apply the compression/decompression resources 112, 113 to conserve bandwidth across the IPSEC channel 117. In addition, the end systems include applications that invoke the compression and decompression resources 110, 111 for particular sessions. Thus a particular session 118 may include compressed payload. In this case, a filter setup message 116 is transmitted by an end system, such as end system 100, or in the alternative end system 106 into the network. It traverses the path of the session 118 and is recognized by intermediate systems 102 and 104. The intermediate systems 102 and 104 pickup the filter setup message 116 and establish the filters 114 and 115 so that they recognize the end-to-end session 118 as a session including compressed payload. In this case, the intermediate device decompression and compression resources 112, 113 are bypassed for packets within the channel 118 at the intermediate systems 102 and 104. That, intermediate system 102 sets up a filter for packets originating at end system 100 to recognize those packets for which compression resources are to be bypassed. Intermediate system 104 sets up a filter to recognize packets that are not compressed by resources 112 at intermediate node 102, and for which decompression resources 104 are to be bypassed. The same process occurs for packets origination at end station 106 in full duplex operations, based on filter setup messaging 120, with the roles of the filters in intermediate nodes 102 and 104 revised. Resources in the network are conserved and efficient management is achieved.

Thus, an end system places active networking data in packets referred to as the filter setup message 116 in FIG. 1 in order to control the behavior of intermediate systems implementing compression algorithms, such as those which implement compression with IPSEC. The filter set up message 116, 120 includes a session identifier such as specific fields in a UDP/IP or TCP/IP header, or information in the data payload (for example in the transport layer payload), or combination of header and payload information. The active networking data in the filter set up message consists of one or more filtering definitions. These definitions are transmitted in various embodiments when establishing a session between end systems, when establishing a session between an end system and an intermediate system such as might occur when the end system creates a layer 2 tunnel to a remote access server, or other kind of tunnel, when an end system sends any packet with compressed data, or at periodic intervals by the end system in order to refresh the filtering definitions of intermediate systems which may discard them based on the expiration of a timer.

Intermediate systems apply these filter definitions to packets they receive. If a filter definition for end station packets is satisfied by the packet incoming from an end station or in a normally unmodified form from a network link, the intermediate system is informed that the data in the packet is already compressed by its source. Thus it would not attempt to compress the data. If no filter definition is satisfied by the packet, the intermediate system attempts to compress the data payload in the packet. If the filter definition for intermediate like packets is satisfied by the packet incoming from a normally compressed intermediate network, then the intermediate station would not attempt to decompress the data. The filter definition for intermediate link packets may be same as or may be different than that for end station packets in appropriate circumstances.

According to one embodiment, the filter setup message 116 includes not only filter definitions but also packet format descriptions associated with the filter definition. The packet format definition specifies which parts of a packet are compressed and which are not. When the filter definition is satisfied, the intermediate system consults that packet format description and does not attempt to compress those parts of the packet that are already compressed; or as appropriate does not attempt to decompress those parts for which compression resources were bypassed at a complementary intermediate station.

According to another embodiment, the filter setup message 116 includes filter definitions and associates with each a small program that either manipulates configuration data within the intermediate device or is called by a device when a packet that satisfies the filter is observed. This allows the end system to specify more sophisticated behavior for handling compressed data. According to this aspect of the invention, the filter setup message 116 comprises an object including variables and methods used for executing various types of filters in the intermediate systems. The filter setup message may include actual objects, or references to objects which can be retrieved from a server in the network such as a LDAP server or other server executing a directory access protocol on the network. According to another embodiment, the filter setup message comprises a JAVA JAR file which can be processed by the intermediate systems according to the present invention. For example the message may include set function and set filter methods specified basically as follows:

1. Set Function (function ID, Interface ID);

This is for binding the compression function (represented by the function ID) to a particular router interface;

2. Set Filter (Filter, Interface ID, Hit or Miss);

This is for setting the filter (represented by a data structure "Filter", which typically specifies source and destination Internet address) on the router interface. "Hit" means if there is a hit on the filter, execute the compression function on the packet, on the other hand, "miss" means if there is not a fit, then execute the function.

According to one implementation of the present invention, the filter setup message 116 is distributed using a protocol such as the resource reservation protocol RSVP, specified according to RFC2205 (September 1997, Network Working Group). According to this implementation, once a session is established according to a transport layer protocol such as TCP/IP or UDP/IP, a session identifier and a port identifier, or other parameters establishing a flow specification for the session, are determined. This session/port identifier is appended to a resource reservation protocol packet which is sent out on the network. Network intermediate systems respond to the RSVP packet to implement the filters according to the present invention and associate the filters with particular sessions identified by their port/session identifiers. A session/port identifier comprises a flow specification by which data packets in the specific channel can be identified.

FIG. 2 illustrates an alternative configuration of a network in which the present invention is applied. Thus, FIG. 2 includes end system 200 which is coupled to intermediate network 201. An intermediate system 202 is coupled to the network 201 and to a second intermediate network 203. An intermediate system 204 is coupled to the intermediate network 203 and to a third intermediate network 205. A tunnel termination system 206 is coupled to intermediate network 205 and intermediate network 220. The intermediate network 220 is connected to end system 207. The end systems 200 and 207 in this embodiment include application layer decompression and compression resources 208 and 209 respectively. The intermediate systems 202 and 204 include decompression and compression resources 210 and 211 respectively. In addition, the intermediate systems 202 and 204 include filter resources 212 and 213 which can be established in response to filter setup messages 214 which are transmitted according to the present invention. In the example of FIG. 2, a Point-to-Point Tunneling Protocol or Layer 2 Tunneling Protocol tunnel 215 is established between end system 200 and tunnel termination system 206. An Internet protocol security channel 216 is established between the intermediate systems 202 and 204. Upon establishment of a communication session between the end systems 200 and 207, the filter setup message 214 is transmitted into the network. The intermediate systems 202 and 204 recognize the filter setup message within the tunnel 215 and establish the filters 212 and 213. According to an alternative embodiment, the compression and decompression resources 208 and 209 are replaced by compression and decompression resources which are associated with the tunnel 215. In this case, the tunnel termination system 206 may act as session end station, and generate and transmit the filter setup message 214.

FIG. 3 illustrates yet another configuration of the network in which the present invention is applicable. The network of FIG. 3 includes end system 300 and end system 305. End system 300 is connected to intermediate network 301. An intermediate system 302 is connected to the intermediate network 301 and to a second intermediate network 303. A tunnel termination system 304 is coupled to the intermediate network 303 and to end system 305. End system 300 and end system 305 include compression and decompression resources 306 and 307 respectively for example in an application layer program, like E-mail or WINZIP. The intermediate system 302 includes compression and decompression resources that are associated with the IPSEC protocol reference 308. In this embodiment, the end system 305 acts as the termination of the IPSEC channel 309 and includes compression and decompression resources 310 which are associated with the IPSEC channel 309. The intermediate system 302 includes the filter resources 311 responsive to a filter setup message 312 to setup filters according to the present invention to manage application of the compression/decompression resources 308 at the intermediate system and 310 at the end system 305. In the embodiment of FIG. 3, a tunnel channel 313 is established between end system 300 and tunnel termination system 304. An IPSEC channel 309 is established between intermediate system 302 and end system 305. A particular communication link is established between the end systems 300 and 305 can be specified by a flow specification. A filter setup message 312 identifies to the communication session by its flow specification and transmits it out into the network where intermediate system 302 establishes filter 311 for controlling application of the compression and decompression resources 308. Similarly, the end system 305 is responsive to the filter setup message to manage use of the compression and decompression resources 310 which are associated with the IPSEC channel 309.

Figure 4:
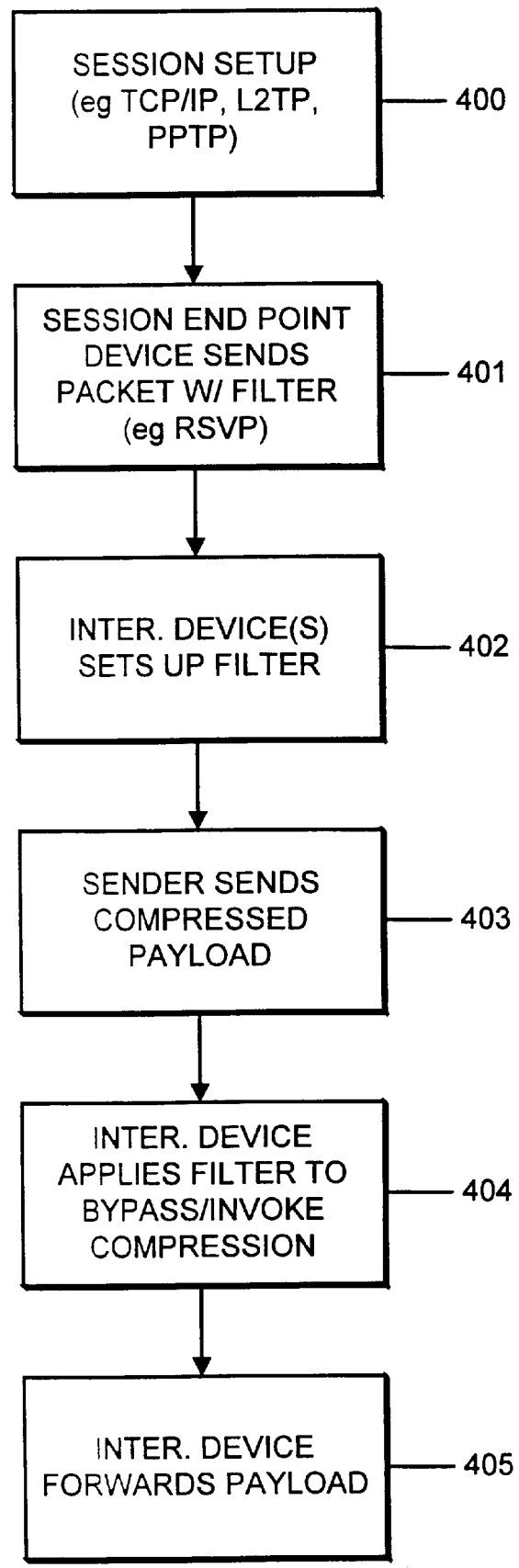
FIG. 4 is a simplified flowchart illustrating a communication process according to the present invention.

FIG. 4 is a simplified flow chart for the establishment of sessions according to the present invention. The algorithm begins at block 400 with a session setup. Thus a communication session according to a transport layer protocol such as the TCP/IP is established. Alternative session setups such as Layer 2 Tunneling Protocol, Point-to-Point Tunneling Protocol or H.323 sessions could be utilized as well as the starting point. Upon establishment of a session at block 400, the session end point device sends a packet with a filter specification referred to as a filter setup message in FIG. 1 (block 401). In one embodiment, this packet is transmitted utilizing a protocol such as the RSVP protocol. Intermediate devices in the path of the session receive the packet carrying the filter specification and setup a filter (block 402). The sender in the session sends a compressed payload (block 403) addressed to the end station of the session. The intermediate device applies the filter to packets it receives in order to bypass or invoke the compression resources (block 404). After invoking the filter, or not, the intermediate device forwards the payload toward the receiving end station (block 405).

Figure 5:
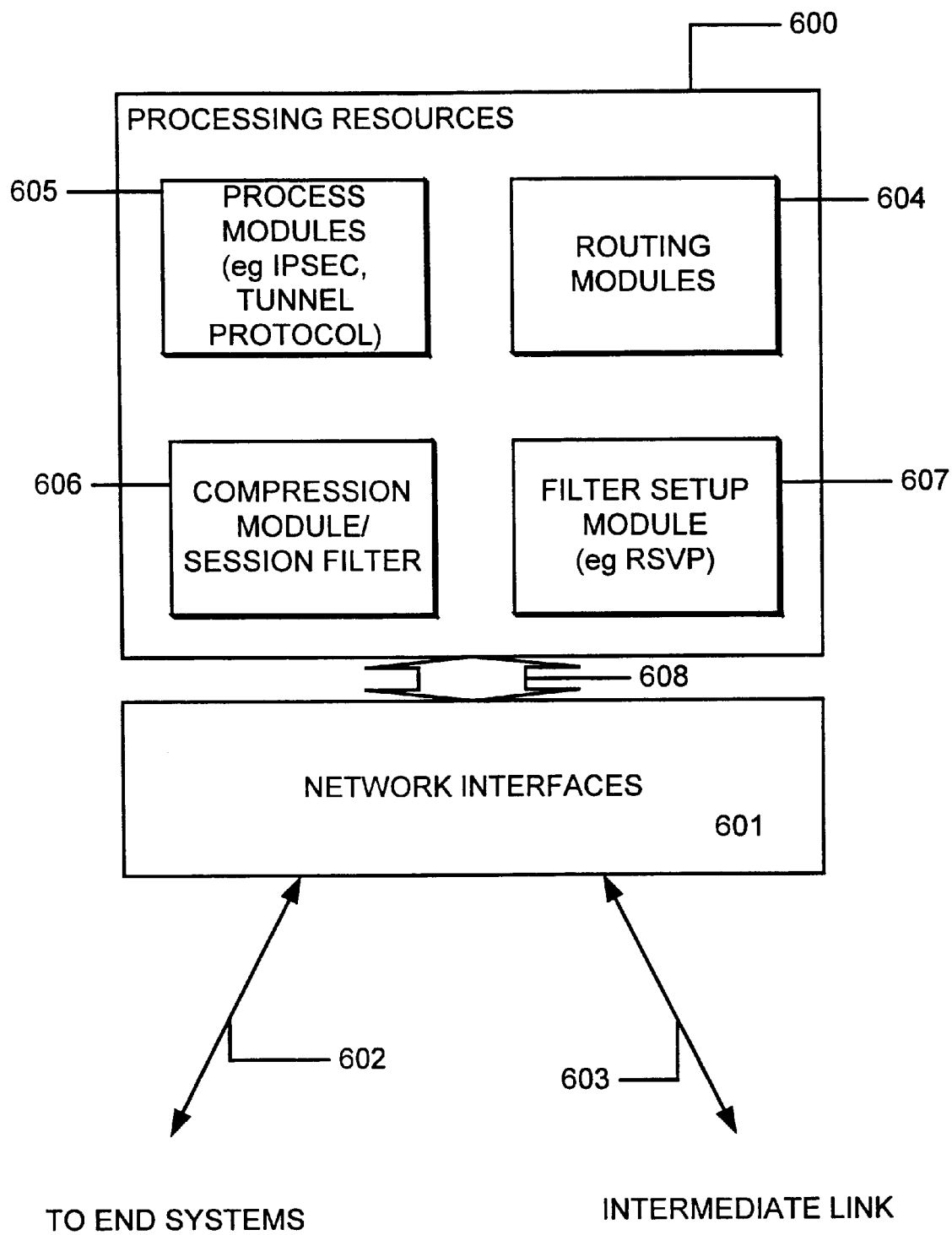
FIG. 5 is a simplified diagram of a network intermediate device including the processing resources of the present invention.

FIG. 5 is a simplified diagram of a network intermediate system 600 including processing resources according to the present invention. The network intermediate system 600 includes network interfaces 601 including a network interface to link 602 and a network interface to link 603. In this simplified example, the link 602 provides a route to end systems and the link 603 provides a route to an intermediate system. The processing resources include routing modules 604 for controlling the intermediate network functions of the device. Other processing modules 605 are included which provide services such as the IPSEC services and tunneling protocol services. According to the present invention, the network intermediate device 600 includes a compression module 606 with a session filter. A filter setup module 607 is included in the device which responds to filter setup messages such as those provided under the RSVP protocol through the network interfaces 601. Network interfaces receive and transmit packets which are provided across data paths 608 into the processing resources of the device. In one embodiment these resources are implemented in a Core Builder 3500 bridge/router provided by 3Com Corporation of Santa Clara, Calif., although a wide variety of intermediate network devices including bridges, routers, switches, and others could be utilized. The Core Builder 3500 router is enhanced by including the filter setup module and session filter associated with compression resources of the device. The intermediate device according to the present invention receives messages indicating characteristics that are relevant to the compression of data payloads in a particular session in the network that is received and transmitted on the network interfaces. The filter setup message in this embodiment is an RSVP type packet which carries active networking data used by the session filter 606 to determine whether to bypass or invoke the compression module 606 for a particular packet. Thus, upon receiving a message, the session filter is setup to identify packets in the particular session. Data payloads are forwarded if they are identified using the filter without applying the compression resources of the intermediate device. Data payloads are forwarded if they are not identified using the filter after applying the compression resources. The compression resources are applied or bypassed for particular segments of a data payload according to the level of detail established in the session filter.

Figure 6:
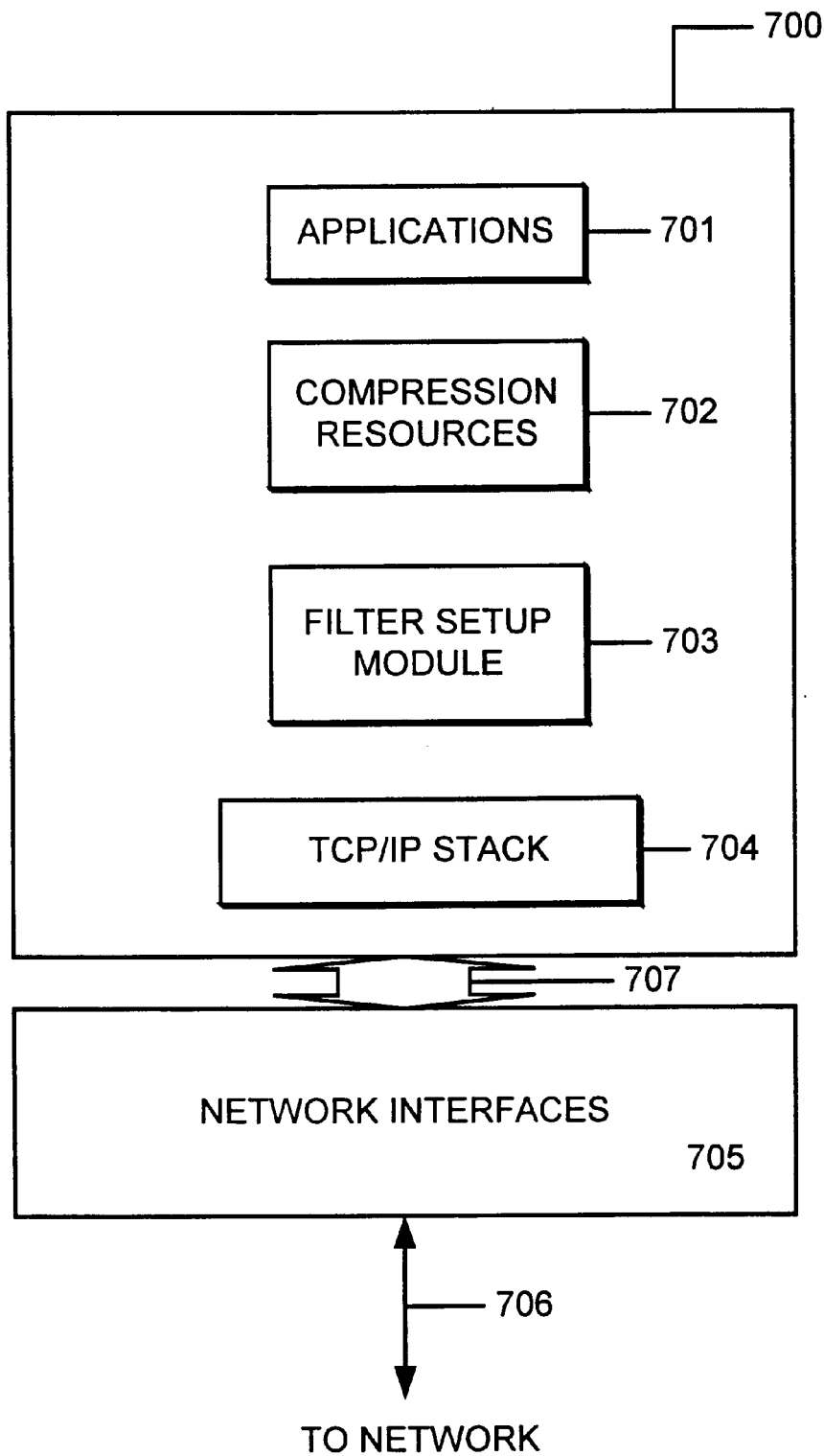
FIG. 6 is a simplified diagram of an end station including processing resources according to the present invention.

FIG. 6 is a simplified diagram of an end station including resources according to the present invention. Thus, the end station 700 includes applications which utilize the communication networks, such as e-mail applications, database applications, specialized compression applications, and the like. Compression resources 702 are included in the device which are associated with the applications, and are thus considered application layer compression resources. Session end stations having compression resources acting at other layers of the network communication module also utilize the present invention. A filter setup module 703 is included according to the present invention as well as a protocol stack such as a TCP/IP stack 704. The system 700 includes a network interface 705 which is connected to the network across link 706. The data path 707 provides data from the network interface and to the network interface from the resources 700. The applications utilizing the TCP/IP stack establish sessions according to the present invention. Upon establishment of the session, the filter setup module 703 issues a filter setup message and transmits it on link 706 into the network. This filter setup message is picked-up by intermediate devices such as that described with respect to FIG. 5. After transmitting the filter setup message, the application 700 commences transmitting packets on the session utilizing the compression resources 702.

Accordingly, the present invention provides for utilizing active networking techniques for messages originated by end stations that compress data. The end systems know when compression is being used and what parts of the packet are being compressed. The end system thus sends an active networking packet which includes a small program or filter parameters in the packet stream to the other end system in the session. The active packet if interpreted by an appropriately configured intermediate device, such as an compression gateway, sets filters in the device that are triggered when a compressed packet is handled by the device. When the filter is triggered, the compression processing code or other code in the device is signaled and the packet or parts of the packets which are compressed, are identified. In this way, the application of the compression resources can be conserved.

The environment in which IPSEC is implemented is one preferred implementation of the present invention. Other applications include any system in which dynamic processing in a communication session between end systems or edge devices in the network renders compression, encryption or other dynamic processing at intermediate links within the session less beneficial. When an end system or edge device recognizes the dynamic processing is being utilized, the filter setup message can be distributed in the network to notify such devices as would otherwise compress already dynamically processed data and waste resources.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. In a network including end stations establishing communication sessions through intermediate devices, and in which, intermediate devices in the network include compression resources, a method for managing use of the compression resources in the intermediate devices, including:

establishing a session for transmitting a plurality of packets having session identifiers and data payloads between a sending end station and a receiving end station, the session having a path through an intermediate device in the network which includes dynamic processing resources;

sending a message in the path indicating a characteristic relevant to the compression resources of the data payloads in the session;

transmitting the plurality of packets.

2. The method of claim 1, wherein establishing a session includes establishing a tunneling protocol session between the sending end station and an intermediate device acting as a tunnel gateway.

3. The method of claim 2, wherein sending a message includes sending the message upon establishment of the tunneling protocol.

4. The method of claim 2, wherein the tunneling protocol comprises Layer 2 Tunneling Protocol.

5. The method of claim 2, wherein the tunneling protocol comprises Point to Point Tunneling Protocol.

6. The method of claim 1, wherein the message comprises filter definitions and a program of instructions executable in the intermediate device.

7. The method of claim 6, wherein the program of instructions comprises a program to manipulate configuration data in the intermediate device.

8. The method of claim 6, wherein the program of instructions comprises a program called by the intermediate device when a packet which satisfies the filter is observed by the intermediate device.

9. The method of claim 1, including:

dynamically processing the data payloads of the plurality of packets at the sending end station in a way which reduces effectiveness of the dynamic processing resources at an intermediate device in the network, and wherein the characteristic comprises notification of the dynamic processing in the sending end station.

10. The method of claim 9, wherein the dynamically processing includes compressing.

11. The method of claim 1, wherein the characteristic comprises a filter definition for identifying packets in the particular session.

12. The method of claim 1, wherein the characteristic comprises a filter definition for identifying packets in the particular session, and identifying dynamically processed parts of identified packets.

13. The method of claim 1, wherein the characteristic comprises a filter definition for identifying packets in the particular session, and identifying compressed parts of identified packets.

14. The method of claim 1, wherein the dynamic processing resources in the intermediate device comprise compression resources.

15. The method of claim 1, wherein the dynamic processing resources in the intermediate device comprise encryption resources.

16. The method of claim 1, wherein the session identifier includes specific fields in a transport layer header.

17. The method of claim 1, wherein the session identifier includes information in a data payload.

18. In a network including end stations establishing communication sessions through intermediate devices, the sessions for transmitting a plurality of packets having session identifiers and data payloads between a sending end station and a receiving end station, and in which, intermediate devices in the network include dynamic processing resources, a method for managing use of the dynamic processing resources in the intermediate devices, including:

receiving at an intermediate device a message indicating a characteristic relevant to the dynamic processing resources, of the data payloads in a particular session;

establishing in response to the message a filter in the intermediate device to identify packets in the particular session;

forwarding the data payloads identified using the filter without applying the dynamic processing resources of the intermediate device on the path of the particular session; and forwarding the data payloads not identified using the filter after applying the dynamic processing resources.

19. The method of claim 18, wherein the message comprises filter definitions and a program of instructions executable in the intermediate device.

20. The method of claim 19, wherein the program of instructions comprises a program to manipulate configuration data in the intermediate device.

21. The method of claim 19, wherein the program of instructions comprises a program called by the intermediate device when a packet identified by the filter is observed by the intermediate device.

22. The method of claim 18, including before forwarding the data payloads, encrypting the data payloads.

23. The method of claim 18, wherein the message comprises a packet transmitted by one of the sending end station and the receiving end station after establishment of the particular session.

24. The method of claim 18, wherein the message comprises a packet transmitted in connection with establishment of the particular session according to a Resource Reservation Protocol.

25. The method of claim 18, wherein the characteristic comprises a filter definition for identifying packets in the particular session, and identifying dynamically processed parts of identified packets.

26. The method of claim 18, wherein the characteristic comprises a filter definition for identifying packets in the particular session, and identifying compressed parts of identified packets.

27. The method of claim 18, wherein the dynamic processing resources in the intermediate device comprise compression resources.

28. The method of claim 18, wherein the dynamic processing resources in the intermediate device comprise encryption resources.

29. The method of claim 18, wherein the session identifier includes specific fields in a transport layer header.

30. The method of claim 18, wherein the session identifier includes information in a data payload.

31. The method of claim 18, wherein establishing a filter includes establishing a first filter for packets incoming from a normally uncompressed link directly coupled to an end station or a normally uncompressed link to an intervening intermediate station, and establishing a second filter for packets incoming from a normally compressed link to another intermediate station.

32. In a network including end stations establishing communication sessions through intermediate devices, and in which, intermediate devices in the network include compression resources applied between intermediate stations in the network, a method for managing use of the compression resources in the intermediate devices, including:

establishing a session for transmitting a plurality of packets having session identifiers and data payloads between a sending end station and a receiving end station according to a transport layer protocol, the session having a path through an intermediate device in the network which includes compression resources;

sending a message in the path of the data payloads in the session include compressed data;

compressing the data payloads in the sending end station; and transmitting the plurality of packets including compressed data payloads to the receiving end station.

33. The method of claim 32, wherein the message comprises a packet transmitted by one of the sending end station and the receiving end station after establishment of the particular session.

34. The method of claim 32, wherein the message comprises a packet transmitted in connection with establishment of the particular session according to a Resource Reservation Protocol.

35. The method of claim 32, wherein the session identifier includes specific fields in a transport layer header.

36. The method of claim 32, wherein the session identifier includes information in a data payload.

* * * * *